United States Patent

Waner et al.

[15] 3,640,155
[45] Feb. 8, 1972

[54] CONTROL SYSTEM FOR COORDINATED ACTUATION OF A TRANSMISSION AND THROTTLE

[72] Inventors: Donald W. Waner, Stow; John E. Litzell, Hudson; Roger F. Olsen, Cuyahoga Falls, all of Ohio

[73] Assignee: North American Rockwell Corporation, Pittsburgh, Pa.

[22] Filed: Apr. 1, 1970

[21] Appl. No.: 24,566

[52] U.S. Cl. .................................. 74/875, 74/32, 74/471, 192/0.098
[51] Int. Cl. ................................... B60k 21/00, G05g 9/08
[58] Field of Search ..................... 74/872, 874, 875, 471, 32; 192/0.098, 0.096

[56] References Cited

UNITED STATES PATENTS

| | | | |
|---|---|---|---|
| 2,875,636 | 3/1959 | Harbaugh | 192/0.098 X |
| 3,142,391 | 7/1964 | Tweit | 74/32 X |
| 2,026,459 | 12/1935 | Caretta | 74/471 X |
| 2,588,650 | 3/1952 | Morse | 192/0.098 |
| 2,759,578 | 8/1956 | Manzolillo | 192/0.098 |
| 2,924,987 | 2/1960 | Pierce | 74/471 X |
| 2,933,943 | 4/1960 | Buddo et al. | 74/471 |
| 3,083,587 | 4/1963 | Buddo | 74/471 |
| 3,153,944 | 10/1964 | Bentley | 192/0.096 X |

FOREIGN PATENTS OR APPLICATIONS 622,339  4/1949  Great Britain ........................ 74/471

Primary Examiner—Carlton R. Croyle
Assistant Examiner—Thomas C. Perry
Attorney—John R. Bronaugh, Floyd S. Levison and E. Dennis O'Connor

[57] ABSTRACT

A control system to provide shifting of a transmission in coordination with the opening and closing of a throttle, both located at a controlled station, by actuation of a single control lever at a control station remote with respect to the controlled station. Only a single push-pull cable is required to transmit motion from the control lever to a reciprocatingly slidable operating member at the controlled station. The operating member has a first drive means in the form of a full unbroken rack of teeth that meshingly engage a fully toothed pinion. Rotation of the fully toothed pinion in response to translation of the operating member effects a shifting of the transmission through a pair of cooperative, interrupted gears. The operating member also has a second drive means in the form of an interrupted rack of teeth that interact with an interrupted pinion. The interruption of the teeth on both the rack and pinion maintain the interrupted pinion stationary in response to movements of the operating member during that portion of its translation by which the transmission is shifted. Thereafter, continued translation of the operating member brings the teeth on the second rack into meshing engagement with the teeth on the interrupted pinion to effect an opening or closing of the throttle.

8 Claims, 6 Drawing Figures

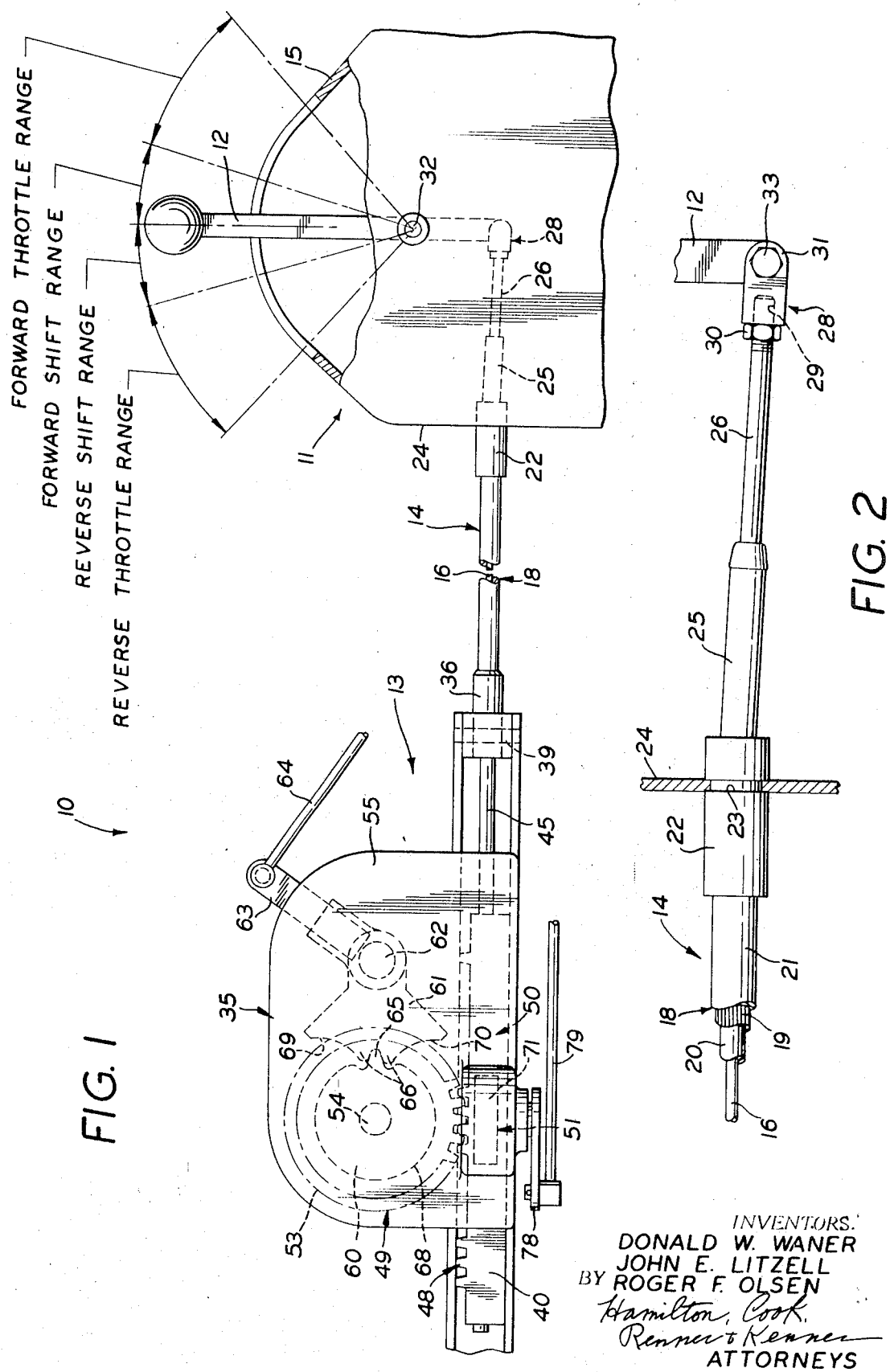

INVENTORS.
DONALD W. WANER
JOHN E. LITZELL
ROGER F. OLSEN
BY Hamilton, Cook,
Renner & Kenner
ATTORNEYS

CONTROL SYSTEM FOR COORDINATED ACTUATION OF A TRANSMISSION AND THROTTLE

BACKGROUND OF THE INVENTION

The present invention relates generally to a single lever control system—a system for shifting a transmission from neutral into forward or reverse, and vice versa, at, or near, idling speed and, in proper sequence with the shifting of the transmission to provide throttle control for the engine operating through the transmission. Such a system is, of course, as well adapted for operating other devices requiring sequential actuation of dual mechanisms.

Most land vehicles use a shift mechanism merely to select a forward or reverse direction of movement for the vehicle and employ a separate brake to slow, or stop, the vehicle. Marine craft employ a shift mechanism not only to select a forward or reverse direction of movement, but also to provide a braking means. Accordingly, the timing involved in the sequential operation of the shift mechanism and the throttle becomes far more critical in the operation of marine craft than it does in the operation of land vehicles.

While skilled and highly practiced helmsmen can achieve this critical sequentiality with individual controls for the transmission and throttle, most people have serious difficulty in achieving sufficient proficiency with individual controls to be safe operators even under normal conditions. When faced with a hazardous situation requiring multiple forward and reverse shifts with concomitant openings and closings of the throttle, the average person becomes a menace not only to his own craft but also to any other craft in proximity to his.

Single lever control systems have been developed in the past to obviate the necessity for individual controls, and those systems do permit the single control lever to be located remotely of the transmission and throttle. Even though one, or more, of the prior art systems do provide most of the operational characteristics that are desirably to be included, most all prior art arrangements require at least two motion-transmitting means operatively to join the single lever control with the transmission and throttle, respectively.

Motion-transmitting means such as push-pull control cables have become highly sophisticated, and the most reliable forms are, therefore, relatively expensive. Moreover, even the most sophisticated forms do possess some backlash and stretch which require occasional adjustment at the control mechanism or the controlled devices to assure that the mechanical motion arriving at the controlled station through the paired push-pull cables does so in the exact phase in which it was imparted thereto by the single lever control mechanism.

SUMMARY OF THE INVENTION

It is, therefore, a primary object of the present invention to provide a control system by which a single lever can, in coordinated sequence, open and close a throttle and selectively shift a transmission at a controlled station when only a single motion-transmitting device operatively connects the single control lever to the remote controlled station.

It is another object of the present invention to provide a control system, as above, which permits incorporation of at least a majority of characteristics desirable in a single lever control system—viz, a preselected angular range for the control lever to effect a shift; any desired throttle dwell through said shift range; and, full actuation of the throttle beyond the shift range.

It is a further object of the present invention to provide a control system, as above, in which backlash and/or stretch in the push-pull cable connecting the control to the controlled station cannot affect the phasing in the coordinated sequential actuation of the dual mechanisms at the controlled station.

These and other objects, together with the advantages thereof over existing and prior art forms which will become apparent from the following specification, are accomplished by means hereinafter described and claimed.

In general, a control system embodying the concept of the present invention is adapted to coordinate the opening and closing of a throttle with the shifting of a transmission at a controlled station by actuation of a single control lever located remotely of the controlled station when the control lever and the controlled station are operatively interconnected by only a single motion-transmitting device.

The control lever is movable from a neutral position through at least one shift range and sequentially thereafter through a throttle range. This movement of the control lever is transferred to an operating member at a remote controlled station by a single motion-transmitting device, preferably a push-pull control cable. The operating member is movably supported in a housing, and a first interconnecting means operatively joins the operating member to a throw member by which the transmission is shifted. A second interconnecting means operatively joins the operating member to a throttle-actuating member by which the throttle is opened and closed in coordinated sequence with the shifting of the transmission.

In the preferred embodiment, the operating member has two drive means, one within each interconnecting means. The drive means included within the first interconnecting means comprises an unbroken rack of teeth that mesh with a fully toothed pinion, the fully toothed pinion, in turn, actuating a set of interrupted gears to shift the transmission and maintain it is the position—drive or neutral—selected. The drive means included within the second interconnecting means comprises an interrupted rack of teeth for cooperative interaction with an interrupted pinion to open and close the throttle in coordinated sequence with the shifting of the transmission.

One preferred embodiment of the present invention is shown by way of example in the accompanying drawings and is described in detail without attempting to show all of the various forms and modifications in which the invention might be embodied; the invention being measured by the appended claims and not by the details of the specification.

DESCRIPTION OF THE DRAWINGS

FIG. 1 is a schematic elevation of a control system embodying the concept of the present invention;

FIG. 2 is an enlarged side elevation of a typical connection between a push-pull cable, the control lever and the console in which the control lever is mounted;

DESCRIPTION OF THE PREFERRED EMBODIMENT

Figure 3:
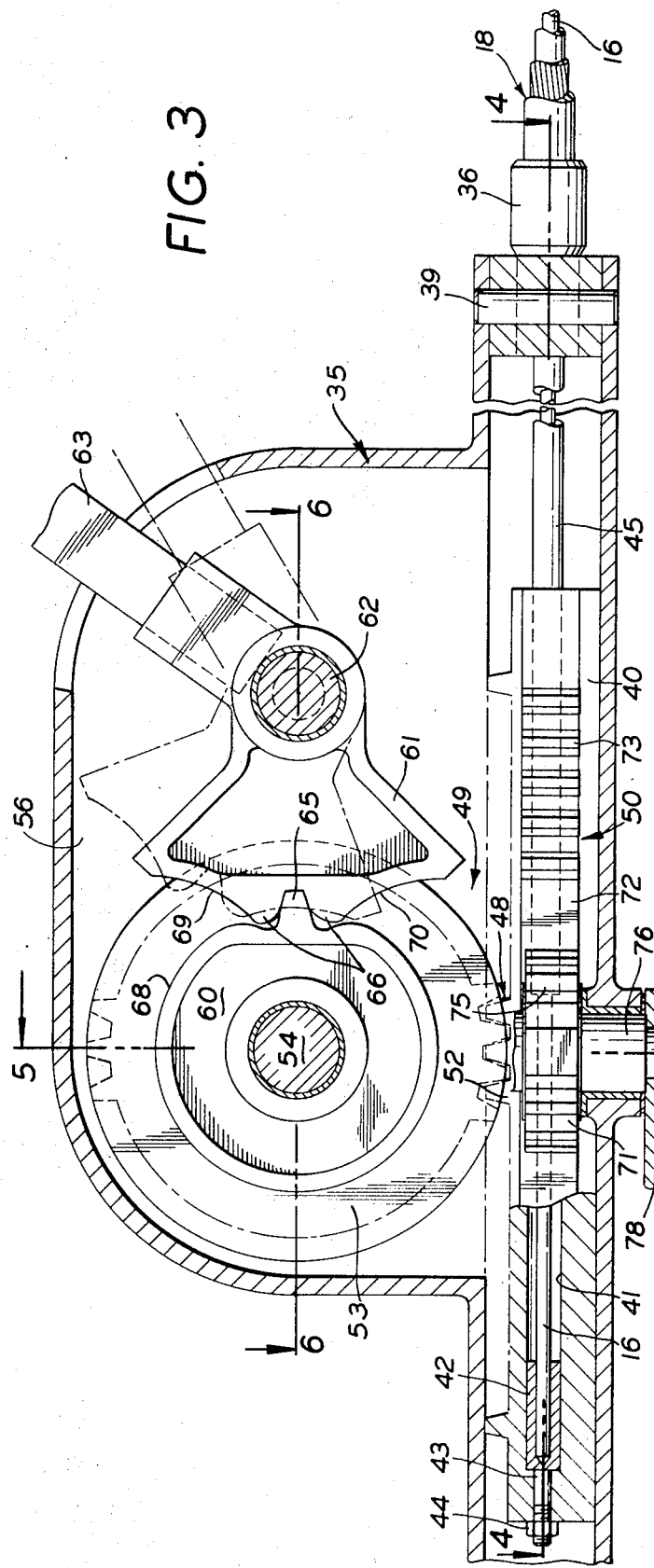
FIG. 3 is an enlarged vertical section through that component of the system located at a controlled station and depicting the first interconnecting means in particular—the solid line representation delineating the relationship of certain elements in the first interconnecting means when the shift mechanism is in neutral and the chain line representation delineating the relationship of the same elements after a shift has been effected.

Referring more particularly to the drawings, a control system embodying the concept of the present invention is indicated generally by the numeral 10 in the schematic representation thereof in FIG. 1. The control system 10 has a helm, or control station, 11 at which a single control lever 12 can be manipulated to shift a transmission and, in coordinated sequence, open or close a throttle at a remote controlled station 13. A single motion-transmitting device 14 operatively connects the control and controlled stations 11 and 13.

The control lever 12 may be pivotally mounted on a console 15 to be movable from a neutral position through a forward and reverse shift range and sequentially thereafter to selective degrees, through a forward or reverse throttle range, respectively.

The motion-transmitting device 14 may well be a single push-pull cable so that movement of the control lever 12 through the various ranges delineated translates the core 16, thereof, within a casing 18. The push-pull cable itself may be of any conventional construction in which the core 16 slidably reciprocates within the casing 18 to transmit mechanical motion by the application of either tensile or compressive forces to the core when at least the ends of the casing are secured with respect to the core.

In the exemplary construction depicted, the casing 18 is formed by a plurality of casing wires 19 laid contiguously, in the form of a long pitched helical coil, about the radially outer surface of an inner, flexible, plastic tube 20 that extends the full length of the casing 18. An outer, flexible cover 21 encases the coil of wires 19 up to within a short distance from the ends thereof.

A fitting 22 is positioned over the end of the cable casing 18 and is cold swaged, or otherwise suitably connected, onto the exposed portion of the cylindrical grouping of wires 19. A plurality of annular ribs, not shown, may be provided within the fitting 22 which, when crimped onto the cover 21, effect a seal between the end fitting 22 and the cover 21.

A retaining notch 23 is provided on the exterior of the fitting 22 for engagement by the sidewall 24 of console 15, for example, to maintain that end of the casing fixed with respect to the console.

An extension tube 25 may be mounted to swivel on the fitting 22, as by a socket arrangement, not shown. The extension tube 25 slidably receives an end rod 26, one end of which is connected to the core 16 interiorly of the tube 25. The extension tube 25 is closely fitted around the end rod 26 in order to guide the end rod and also to prevent excessive deflection of that portion of the core 16 sliding therein, particularly when subjected to compressive loads.

The end rod 26 is secured to the control lever 12 as by a clevis connector 28. The clevis connector 28 has a head portion that is axially bored, at 29, to receive the end rod 26. The bore 29 may be threaded matingly to receive the correspondingly threaded end rod 28, and a locknut 30 may be employed to assure the connection therebetween.

The bifurcated arm portion 31 of a clevis connector 28 straddles the control lever 12 in spaced relation to the pivot means 32 by which the lever 12 is mounted to swing and may be attached thereto by a pin 33.

At the controlled station 13, the control system 10 employs a housing 35 that may be fixedly secured in proximity to the transmission and throttle (not shown) to be controlled. For example, should the transmission and throttle be those associated with an outboard engine, the housing 35 may be mounted directly thereon.

That end of the casing 18 terminating at the controlled station 13 may also be provided with an end fitting 36. End fitting 36 may have a locking groove 38 extending transversely thereof for engagement with an anchor pin 39 to maintain that end of the casing 18 fixed with respect to the housing 35.

Figure 4:
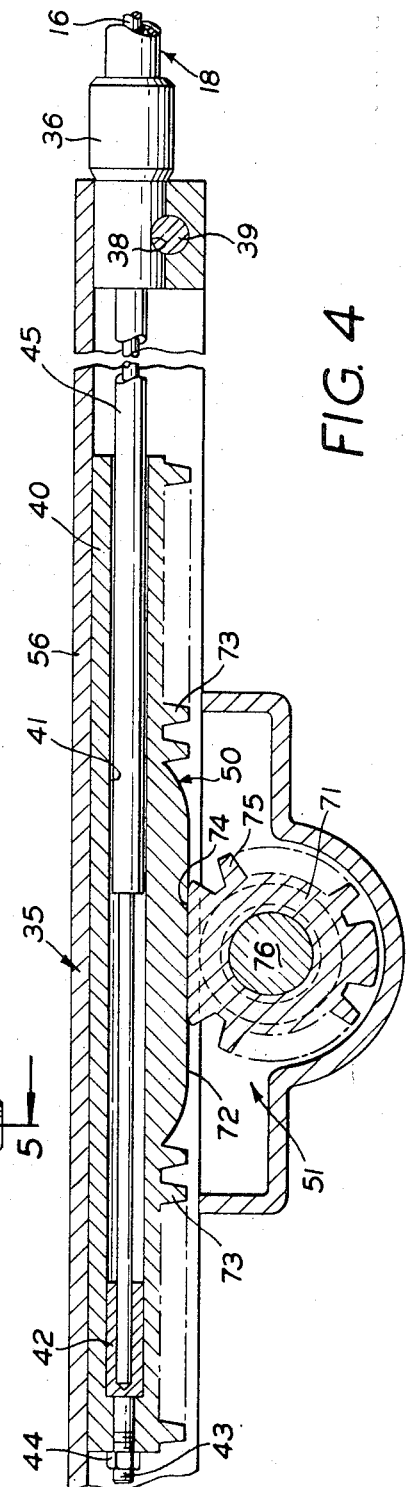
FIG. 4 is a cross section taken substantially on line 4—4 of FIG. 3 depicting the second interconnecting means in particular.
Figure 5:
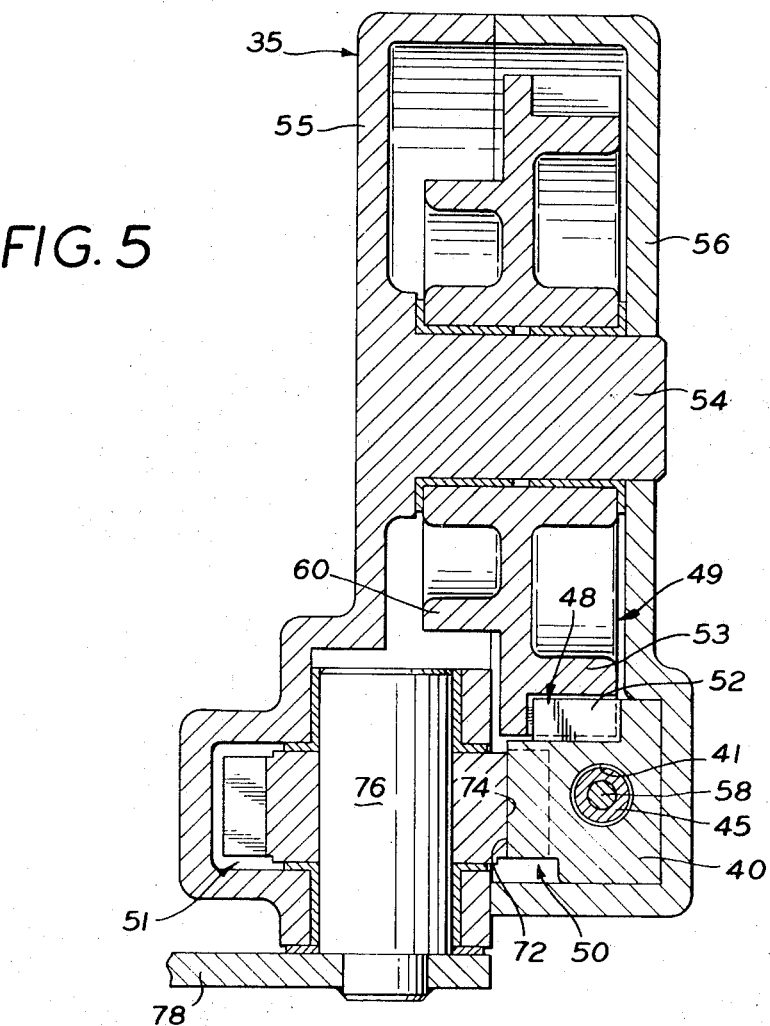
FIG. 5 is a further enlarged cross section taken substantially on line 5—5 of FIG. 3 and depicting the relationship of the operating member to both the first and second interconnecting means; and, FIG. 6 is a cross section taken substantially on line 6—6 of FIG. 3 depicting the first interconnecting means in further detail.
Figure 6:
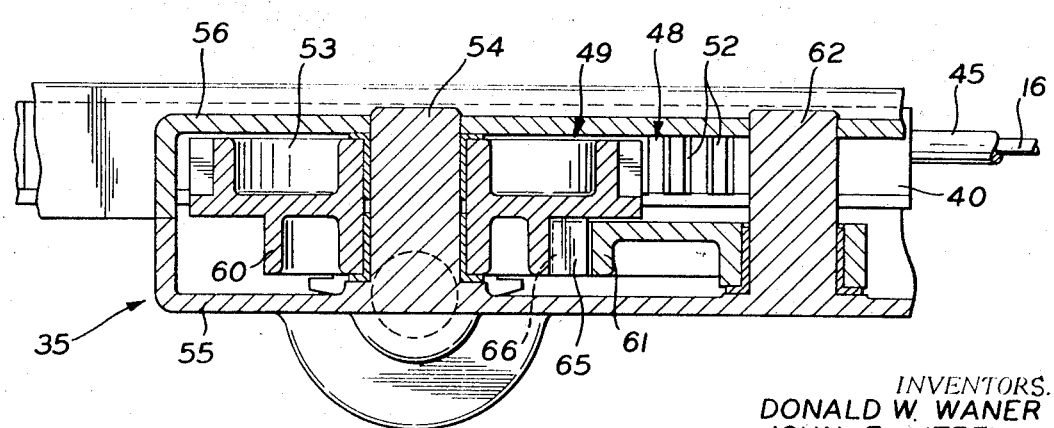

An operating member 40 is movable within the housing 35. As best seen in FIGS. 3–5, the operating member 40 may comprise an elongated block that is reciprocatingly translatable within the housing 35. The push-pull core 16 is attached to the operating member 40. As shown, a bore 41 penetrates one end of the operating member 40 and extends axially along substantially the full length of the operating member 40, terminating just short of the opposite end thereof. The core 16 spans the axial extent of the bore 41 and terminates in an anchor plug 42 secured thereto, as by swaging. A stem 43 on the anchor plug 42 pierces the closed end of the operating member 40 to receive a locking nut 44.

As depicted in the drawings, one should also adopt an extension tube arrangement 45 to the end fitting 36 so that the core 16 need not extend unsupported from the end fitting 36 to the operating member 40. It may also be advantageous under some circumstances to employ an end rod as well.

The operating member 40 is provided with two toothed drive means. The first drive means 48 comprises one component of a first interconnecting means 49 by which shifting of the transmission is effected, and the second drive means 50 comprises one component of a second interconnecting means 51 by which the throttle may be selectively opened and closed.

The first drive means 48 presents an unbroken rack of teeth 52 for continuous meshing engagement with a fully toothed pinion 53 rotatably mounted on a cross shaft 54 extending outwardly from one side plate 55 of housing 35 and supported in the opposite side plate 56. The cross shaft 54 is thus oriented transversely of, and spaced with respect to, the axis 58 along which the drive member 40 slidably reciprocates. Secured to, or, as shown, integral with, the fully toothed pinion 53 for rotation therewith is a first interrupted gear member 60 that meshes, in the shift ranges of control lever 12, with a second interrupted gear member 61 rotatably mounted on a second cross shaft 62 to swing a throw member 63 which may be operatively connected to the shift mechanism of a transmission (not shown), as by the link rod 64.

As shown, the gear members 60 and 61 may have a varied pitch so that rotation of the first gear member 60 through a selected angular range in either direction from the neutral position will effect a corresponding rotation of the second gear member 61 through the required angular range—i.e., from the solid to the chain line position depicted in Fig. 3. As the control lever 12 is moved (and thus operating member 40) to rotate the first interrupted gear 60 beyond the selected angular range for effecting the shift, the interrupted teeth 65 and 66 on gears 60 and 61, respectively, unmesh, and even though the first gear 60 will continue to rotate during actuation of the throttle, as described below, the arcuate peripheral edge 68 on the first gear 60 will slidably engage one of the arcuately convex faces 69 or 70 on the second interrupted gear 61 to maintain the clutch throw member 63 stationary. This interaction of the edge 68 with the corresponding face 69 or 70 thus maintains the transmission secured in the selected drive range.

The second drive means 50 presents an interrupted rack for cooperative interaction with an interrupted pinion 71. Specifically, the second drive means 50 has a medial, toothless ridge portion 72 flanked on both ends with teeth 73. The toothless ridge portion 72 slidably engages a flatted chord surface 74 on the pinion 71 that is similarly flanked by teeth 75 when the control lever 12 is in the neutral position.

The interrupted pinion 71 is secured to an axle 76 that is journaled within the housing 35 and nonrotatably affixed to a throttle-actuating arm 78 that is operatively connected to the throttle (not shown), as by link rod 79.

In operation, when the control lever 12 is swung from its neutral position through one of the shift ranges, to the corresponding throttle range, the cable core 16 will translate the operating member 40 through a proportionate distance. During this movement of the operating member 40 the fully toothed pinion 53—and the first interrupted gear 60——will be rotated to swing the second interrupted gear member 61 through its full range to effect a shifting of the transmission into either forward or reverse, depending upon the direction through which the control lever 12 is swung. At the same time, the toothless ridge portion 72 in the second drive means 50 on operating member 40 slides along the chord surface 74 on the interrupted pinion 71 to maintain the latter against rotation and thus assure absolute throttle dwell during the shift. Of course, should a particular application of this system make it desirable to have some modest throttle advance contemporaneously with the shift, the axial span of the ridge portion 72 can be lessened accordingly.

As the control lever 12 enters the throttle-actuating range beyond the shift range continued sliding movement of the operating member 40 will further rotate the fully toothed pinion 53 so that the arcuate peripheral edge 68 on the first interrupted gear 60 will contact the appropriate face 69 or 70 on the second interrupted gear 61 to maintain the second interrupted gear—and thus the transmission shift—immobile. At the same time, this continued sliding translation of the operating member 40 will bring the teeth 73 on one or the other end of the toothless ridge portion 72 of the second drive means 50 into meshing engagement with the teeth 75 on the interrupted pinion 71. After the teeth 73 and 75 have thus engaged, continued axial translation of the operating member 40 will rotate the interrupted pinion 71 to swing the throttle actuating arm 78. The angular degree through which the control lever 12 is swung will be directly proportional to the extent through which the operating member 40 is translated so that the throttle setting can be selectively determined.

Retrorotation of the control lever 12 from either throttle range, through the corresponding shift range and into neutral moves the operating member 40 in the opposite direction to close the throttle and shift the transmission back into neutral.

It should now be apparent that a control system embodying the concept of the present invention provides for operation of a transmission and throttle at a remote controlled station by a single control lever that is operatively connected to the controlled station by only a single motion-transmitting device and otherwise accomplished the objects of the invention.

What is claimed is:

1. A system for coordinated sequential control of dual mechanisms at a controlled station by a control lever at a remote control station comprising a single lever movable from and to a neutral position and through at least one operating range, a single motion-transmitting device operatively interconnected between the single lever and an elongate block at the controlled station, said elongate block slidably translatable in said housing, a first throw member to actuate the first of said dual mechanisms, first interconnecting means between said elongate block and said throw member to effect actuation of the first of said dual mechanism in response to movement of the control lever through a selected portion of the operating range, a second throw member to actuate the second of said dual mechanisms, second interconnecting means between said elongate block and said second throw member to effect actuation of the second of said dual mechanisms in response to movement of the single lever through a second selected portion of the operating range, said first interconnecting means comprises a rack on said operating member meshingly engaged with a rotatable pinion, interrupted gears operatively connecting said pinion to the first throw member.

2. A system as set forth in claim 1 in which said second interconnecting means comprises a rack means operatively engaging a pinion means, said rack and pinion means having interrupted teeth for maintaining said pinion means immobile during a selected degree and portion of movement of the single lever through the operating range, said rack means being provided with a toothless ridge portion flanked by teeth and said pinion means has a flatted chord flanked by teeth, engagement of said ridge portion with said chord portion maintaining said pinion means immobile, said toothless ridge is selectively located along said rack means to effect actuation of the second of said dual mechanisms during the selected portion of movement of the single lever through the operating range.

3. A system, as set forth in claim 2, in which the first interconnecting means comprises a fully toothed rack meshingly engaging a fully toothed pinion, interrupted gear means connecting said fully toothed pinion to said first throw member, said interrupted gear means being oriented with respect to said fully toothed pinion to effect actuation of the first of the dual mechanisms in response to movement of the single lever through a selected portion of the operating range.

4. A system, as set forth in claim 3, in which the motion-transmitting device is a push-pull cable, said cable having a core slidably received within a casing, said casing being secured to said housing, and said core being secured to said operating member.

5. A system, as set forth in claim 4, in which an axial bore is provided in said operating member, said cable core extending into and along said bore and being enclosed therein, an extension tube operatively connected to said cable casing and also extending into said bore, said extension tube supporting said cable core between said cable casing and said operating member.

6. A system, as set forth in claim 5, in which both said rack and pinion are fully toothed.

7. A system, as set forth in claim 6, in which said interrupted gears are oriented with respect to said pinion to effect actuation of the first of the dual mechanisms in response to movement of the single lever through the selected portion of the operating range.

8. A system for shifting the transmission of an engine and opening and closing the throttle thereof comprising, a control station and a remote controlled station, a single lever mounted at said control station and movable from a neutral position through a shift range and, sequentially thereafter, a throttle range, a housing at said controlled station, an elongate block axially translatable in said housing, a single motion-transmitting means operatively connecting said control lever to said elongate block for movement of the latter in response to movement of the former, a throw member to shift the transmission, first interconnecting means between said elongate block and said throw member to effect a shift of the transmission during movement of said control lever through the shift range, a throttle-actuating member to open and close the throttle, a second interconnecting means between said elongate block and said actuating member selectively to open and close the throttle during movement of said control lever through the throttle range, said first interconnecting means comprises a fully toothed rack meshingly engaged with a fully toothed pinion and interrupted gears operatively connect said fully toothed pinion to the throw member, and in which said second interconnecting means comprises a rack means having a toothless ridge portion flanked by teeth operatively engaging a pinion means having a flatted chord flanked by teeth, said ridge portion engaging said chord to maintain the desired throttle dwell during the shift of the transmission and the teeth on said rack means and pinion means meshingly engage to open and close the throttle.

* * * * *

PO-1050
(5/69)

UNITED STATES PATENT OFFICE
CERTIFICATE OF CORRECTION

Patent No. 3,640,155     Dated February 8, 1972

Inventor(s) DONALD W. WANER et al

It is certified that error appears in the above-identified patent and that said Letters Patent are hereby corrected as shown below:

Column 3, line 67, after "push-pull" insert ---cable---.

Signed and sealed this 8th day of May 1973.

(SEAL)
Attest:

EDWARD M.FLETCHER,JR.
Attesting Officer

ROBERT GOTTSCHALK
Commissioner of Patents